UNITED STATES PATENT OFFICE.

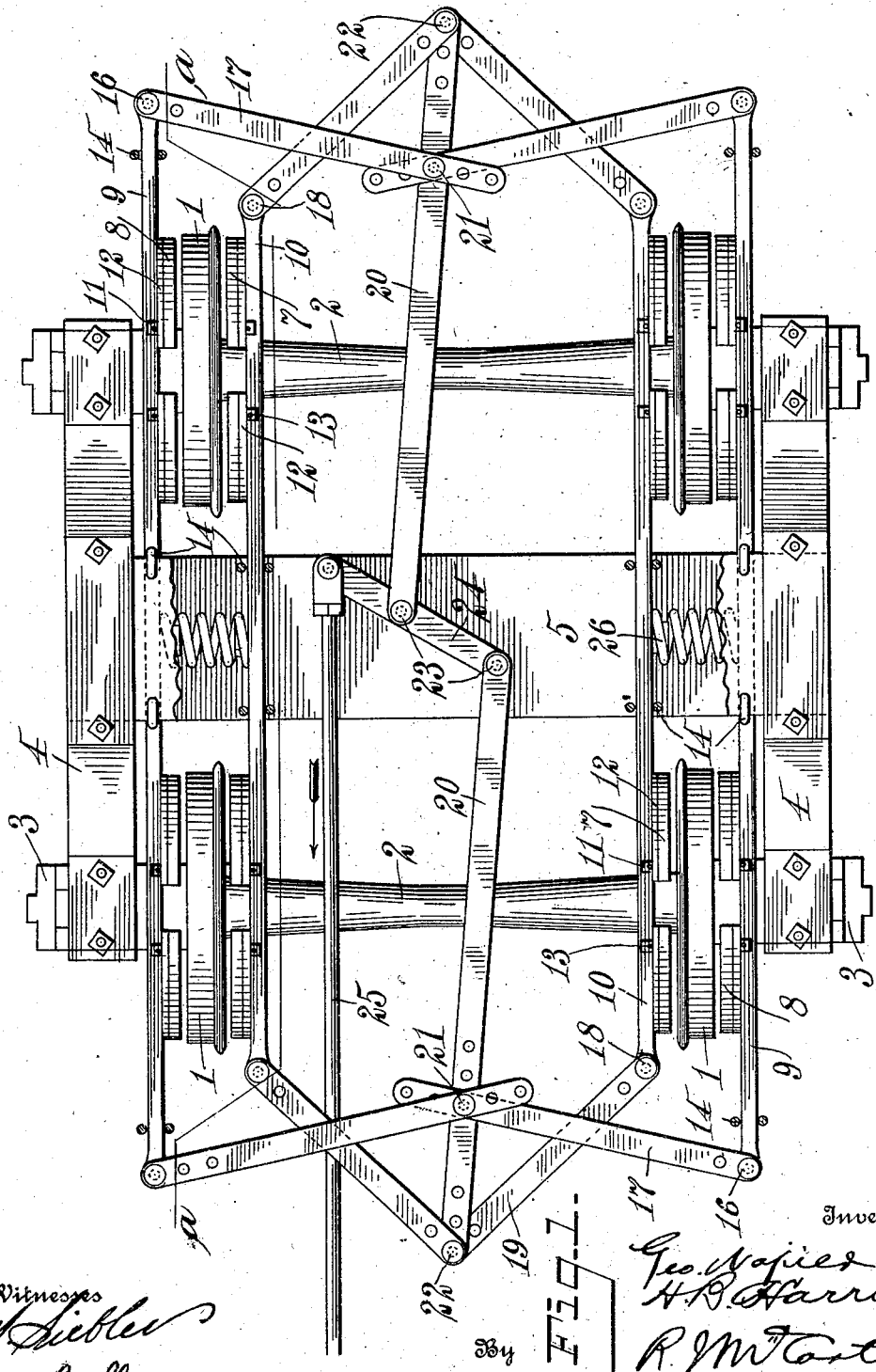

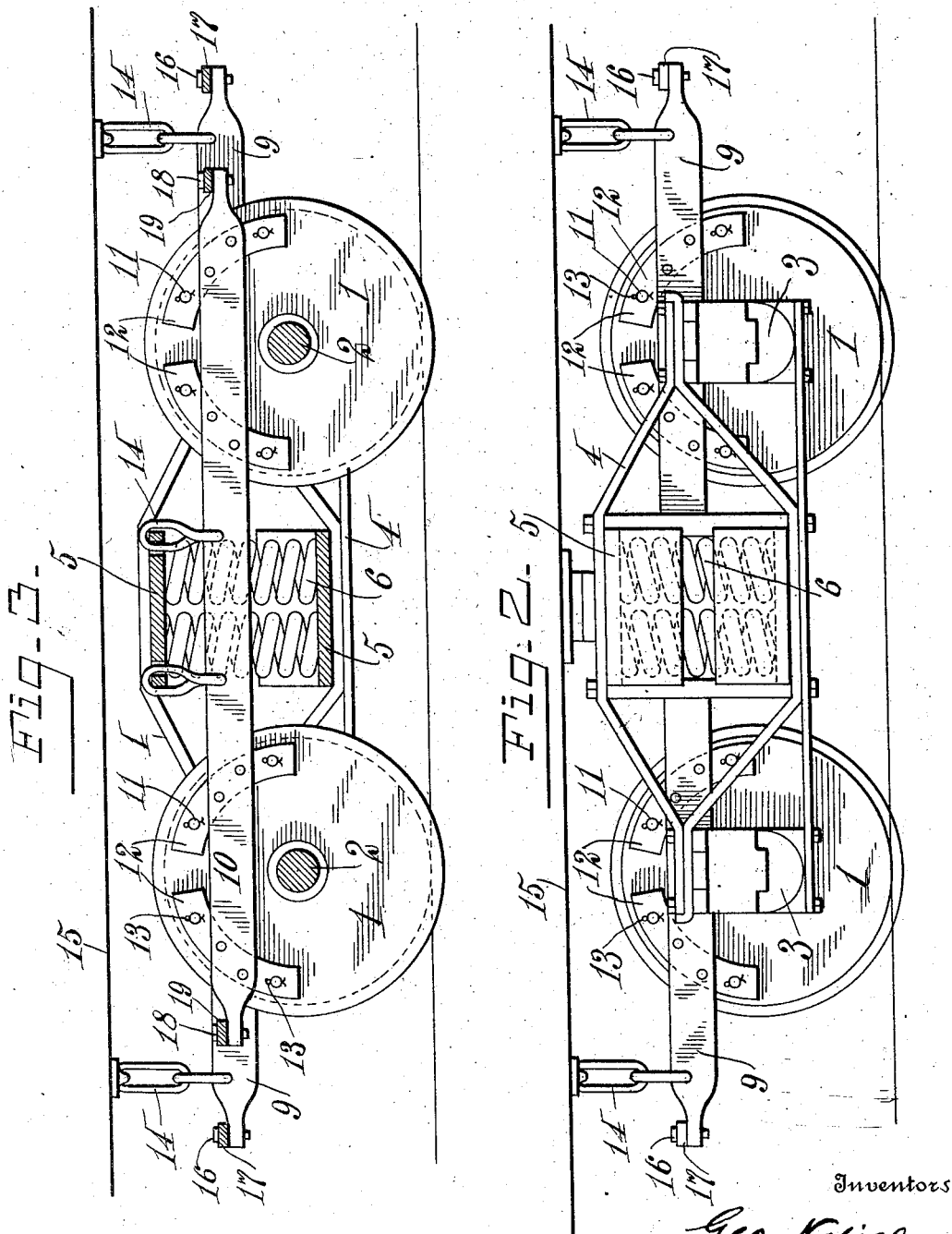

GEORGE NAPIER AND HARRY B. HARRIS, OF DAYTON, OHIO.

BRAKE IN RAILWAY-TRUCKS.

1,079,357.  Specification of Letters Patent.  Patented Nov. 25, 1913.

Application filed June 4, 1913. Serial No. 771,674.

*To all whom it may concern:*

Be it known that we, GEORGE NAPIER and HARRY B. HARRIS, citizens of the United States, residing at Dayton, in the county of Montgomery and State of Ohio, have invented certain new and useful Improvements in Brakes in Railway-Trucks; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in brakes for railway trucks.

The objects of the invention are several, principally among which is to provide a brake mechanism which may be applied equally to the wheels of the truck and thus avoid the effect of raising the truck from the rails, which frequently happens when the brakes are applied to the peripheries of the wheels; and further to provide for a large area of frictional contact with the wheels, thereby insuring a positive stoppage when the brakes are applied.

Referring to the accompanying drawings, Figure 1 is a top plan view of a truck provided with our invention; Fig. 2 is a side elevation of the truck; and Fig. 3 is a section on the line *a—a* of Fig. 1.

In the specification and drawings, similar reference characters indicate corresponding parts.

Referring more particularly to the drawings, 1 represents the wheels of a car truck which are mounted on axles 2. The outer ends of the axles find bearings in journal boxes 3 mounted on the ends of side frames 4. The side frames 4 extend from a bolster 5 which is provided with the usual springs 6. While we have shown and described one well known and particular form of truck, it is to be understood that the invention may be applied to any type of truck. Adapted to engage the inner and outer faces of the wheels 1 are brake shoes 7 and 8, semi-circular in form to conform to the curvature of the wheels. The said brake shoes are mounted on outer and inner brake beams 9 and 10, respectively. The shoes 7 are removably attached to the beams and are provided with pins 11 which enter suitable openings in brake shoe holders 12 secured to said beams. The pins 11 are adapted to receive cotter pins 13 which are instrumental in holding the brake shoes in position. The brake beams 9 and 10 may be suspended or supported by any well known means, such as links 14 which extend from the bolster 5 and from the bottom of the car 15. The brake shoes are pressed against the opposite sides or faces of the wheels by the following system of toggle levers:—Pivotally attached at 16 to the ends of the outer brake beams 9 are outer brake links 17, while pivotally attached at 18 to the ends of the inner brake beams 10 are inner brake links 19. The links 17 and 19 are pivotally connected to connecting rods or links 20 at 21 and 22, respectively. The ends of the said connecting rods or links 20, opposite the pivots 21 and 22, are pivoted at 23 to a floating lever 24. Attached to one end of this floating lever 24 is a brake-actuating rod 25 which is also connected to the brake actuating means, such as the usual hand wheel or brake cylinder (not shown). When the actuating rod 25 is moved in the direction of the arrow (Fig. 1), the rods or links 20 will be moved inwardly. When this movement takes place, the links 17 will draw the outer brake beams 9 inwardly and the shoes 8 against the outer faces of the wheels 1, while the links 19, acting as struts, will force the brake beams 10 outwardly and the inner shoes 7 against the inner faces of the wheels 1. When the brakes are released, the shoes are relieved from contact with the wheels by any well known means, such as springs 26 mounted between the brake beams 9 and 10 adjacent to the bolster. It will be seen, that, by thus constructing a brake, a large area of frictional contact is secured, which is effective in securing a positive braking effect. Also, that the pressure applied to the wheels is equal.

We claim.

In combination with a car truck including the wheels, brake members conforming substantially to the curvature of said wheels and arranged to engage the opposite sides of said wheels, side beams mounted along the inner and outer sides of said wheels, and supporting said brake members, links arranged substantially parallel with said beams and mounted between the wheels, connecting links extending between said side beams and the links arranged parallel to said side beams, and a lever to which said first named links are connected and from which motion is imparted to said beams, substantially as described.

In testimony whereof we affix our signatures, in presence of two witnesses.

GEORGE NAPIER.
HARRY B. HARRIS.

Witnesses:
R. J. McCarty,
Matthew Siebler.